United States Patent
McKinnon et al.

(10) Patent No.: US 10,794,016 B2
(45) Date of Patent: Oct. 6, 2020

(54) CURBING MACHINE WITH HOPPER DASHER AND ELIPTICAL COMPACTION

(71) Applicants: Paul G McKinnon, Brigham City, UT (US); Lane McKinnon, Brigham City, UT (US)

(72) Inventors: Paul G McKinnon, Brigham City, UT (US); Lane McKinnon, Brigham City, UT (US)

(73) Assignee: Team Inc., Brigham City, UT (US)

( * ) Notice: Subject to any disclaimer, the term of this patent is extended or adjusted under 35 U.S.C. 154(b) by 192 days.

(21) Appl. No.: 16/172,753

(22) Filed: Oct. 27, 2018

(65) Prior Publication Data
US 2020/0131720 A1  Apr. 30, 2020

(51) Int. Cl.
| | | |
|---|---|---|
| *E01C 19/48* | (2006.01) | |
| *B28B 3/24* | (2006.01) | |
| *B29C 48/30* | (2019.01) | |
| *B29C 48/25* | (2019.01) | |
| *B29K 103/08* | (2006.01) | |
| *B29L 31/10* | (2006.01) | |
| *B29C 48/265* | (2019.01) | |

(52) U.S. Cl.
CPC ............ *E01C 19/4893* (2013.01); *B28B 3/24* (2013.01); *B29C 48/252* (2019.02); *B29C 48/265* (2019.02); *B29C 48/30* (2019.02); *B29C 48/301* (2019.02); *B29K 2103/08* (2013.01); *B29L 2031/10* (2013.01)

(58) Field of Classification Search
CPC ... E01C 19/4893; E01C 19/48; B29C 48/252; B29C 48/265
See application file for complete search history.

(56) References Cited

U.S. PATENT DOCUMENTS

| | | |
|---|---|---|
| 2,818,790 A | 1/1958 | Canfield et al. |
| 3,137,220 A | 6/1964 | Smith |
| 3,161,117 A | 12/1964 | Supject |
| 3,733,141 A * | 5/1973 | James, III ........... E01C 19/4893 404/98 |
| 3,890,055 A | 6/1975 | Rochfort |
| 3,915,583 A | 10/1975 | Aparicio |
| 3,915,584 A | 10/1975 | Coho, Jr. et al. |
| 3,920,349 A * | 11/1975 | Jennings, Jr. ....... E01C 19/4893 404/98 |
| 4,152,382 A * | 5/1979 | Catenacci ............... B28B 1/084 264/33 |
| 4,298,293 A | 11/1981 | Baucum |
| 4,310,293 A | 1/1982 | Eggleton |
| 4,548,565 A | 10/1985 | Bunn |
| 4,566,823 A | 1/1986 | May |

(Continued)

*Primary Examiner* — Abigail A Risic
(74) *Attorney, Agent, or Firm* — Marcus G. Theodore

(57) ABSTRACT

A concrete curb forming and extruding apparatus with wheel adjustment locks, and an adjustable slip form system shaping cementitious material into a continuous curb forced there through by an extruder which receives materials stored in a hopper with dasher. The extruder has a rotary trowel compacting member which continually forces material from the hopper into compressed concrete passing through an adjustable slip form to fill the same and form differing shaped continuous curbing underneath fences or against vertical surfaces or conventional curbing, depending upon the slip form setting.

7 Claims, 8 Drawing Sheets

(56) References Cited

U.S. PATENT DOCUMENTS

| | | | | |
|---|---|---|---|---|
| 4,936,763 | A | * | 6/1990 | Thomas ............... E01C 19/4893 264/33 |
| 4,984,932 | A | | 1/1991 | Leone |
| 5,018,955 | A | * | 5/1991 | Parrish ................ E01C 19/4893 249/2 |
| 5,354,189 | A | | 10/1994 | McKinnon |
| 5,527,129 | A | | 6/1996 | McKinnon |
| 6,450,730 | B1 | * | 9/2002 | Matthias ............. E01C 19/4893 404/101 |
| 6,863,470 | B2 | * | 3/2005 | Eggleton ............. E01C 19/4893 404/98 |
| 7,441,987 | B1 | * | 10/2008 | Sampey ............. E01C 19/4893 404/108 |
| 8,128,390 | B2 | | 3/2012 | O'Hara |
| 9,316,343 | B2 | | 4/2016 | O'Hara |
| 10,407,845 | B1 | * | 9/2019 | Downing ............ E01C 19/4853 |
| 2002/0021931 | A1 | | 2/2002 | Matthias et al. |
| 2002/0021938 | A1 | * | 2/2002 | Matthias ............. E01C 19/4893 404/98 |
| 2011/0117230 | A1 | * | 5/2011 | O'Hara ................... E04G 11/20 425/62 |
| 2014/0105683 | A1 | * | 4/2014 | McKinnon .......... E01C 19/4893 404/97 |
| 2014/0377002 | A1 | * | 12/2014 | Seever ................ E01C 19/4893 404/98 |
| 2019/0145064 | A1 | * | 5/2019 | Menard ................... E01C 19/48 404/101 |

\* cited by examiner

CURBING MACHINE WITH HOPPER DASHER AND ELIPTICAL COMPACTION

BACKGROUND OF THE INVENTION

Field

This invention relates to concrete curb forming and extruding apparatus. More particularly, it relates to a concrete curb forming and extruding apparatus with wheel adjustment locks, and an adjustable slip form system shaping cementitious material into a continuous curb forced there through by an extruder which receives materials stored in a hopper with dasher. The extruder has a rotary trowel compacting member which continually forces material from the hopper into compressed concrete passing through an adjustable slip form to fill the same and form differing shaped curbing from continuous curb underneath fences or against vertical surfaces to conventional curbing, depending upon the slip form setting.

State of the Art

Present concrete curb forming and extruding machines have a reciprocating ram or an auger to force concrete material into a slip form forming a running curb. The concrete material is usually of a dry consistency to hold the form of the curb after being extruded from the machine. The dry consistency of the material causes it to bridge from side to side in the hopper and not fall through into the compaction chamber. It is common practice to have two men run the machine-one to steer and control the machine while the other shovels small amounts of material into and through the hopper.

Rochfort, U.S. Pat. No. 3,890,055 issued Jun. 17, 1975 discloses a motor driven concrete laying machine for laying a continuous run of concrete. It uses augers, pumps, rotary drive, and other compacting members for force concrete from a hopper through a mold as it is propelled along by drive wheels.

Supject, U.S. Pat. No. 3,161,117 issued Mar. 6, 1961 discloses another curb forming machine propelled along by continuous tracks, and employing a screw drive auger to force the concrete from a hopper through a mold.

The ram type of curb forming and extruding machines move ahead when a shovel of material is put through the hopper. This forward movement is generally two or three inches per stroke. The ram then cycles without moving the machine until the next shovel of material is put through the hopper. This erratic action causes voids which have to be filled. It also causes curb cracks when the machine coasts at the end of the stroke. These ram type machines use a gear box to reduce the speed with a crank arm connected to a fiat faced member which is pushed by the crank through the compaction chamber or housing displacing the curbing material through the slip form to form the curb.

May, U.S. Pat. No. 4,566,823 issued Jan. 1, 1986 is an example of a manually operable curb extrusion device with interchangeable molds and compacting members wherein building material is placed in a receiving hopper and falls into a compacting chamber where a power driven and reciprocating compacting member compacts the material into the extrusion mold where it is shaped and extruded. The curb extrusion device is manually directed or steered along the desired course via an adjustable steering mechanism, and has a hopper with one straight upright side, screw-on molds, and adjustable legs connected to the wheels. Eggleton, U.S. Pat. No. 4,310,293 issued Jan. 12, 1982 is another example of a ram driven concrete curb molding apparatus.

Ram machines have been the most popular because of their positive upward travel. However, straight compressive forces are not conducive to better compaction. Varying sizes of particles resist compaction and stack one against another, leaving voids or cavities between the particles. Voids cause porous concrete with diminished compressive test strengths.

The ram of the ram curb forming machine also picks up some of the concrete material on the return back-stroke which is then deposited as a trail of material down the sides of the curb as waste. This slag has to be cleaned up or pressed down out of sight and buried. Ram machines, as the speed of the ram is increased, tend to jump ahead and then coast forward at the end of the stroke which puts cracks in the top surface of the curb. Loose parts on the machine, such as wheels, can also leave marks in the extruded curb.

McKinnon, U.S. Pat. No. 5,527,129 issued Jun. 18, 1996 avoids the ram compaction waste problems, and provides an improved elliptical orbit compaction curb forming and extruding apparatus curb, which provides a curb having strong compressive strength with a smooth finished look requiring no manual troweling. The elliptical orbit compaction also allows a shovel full of material to be fed more evenly through the apparatus over a number of ram strokes. This builds a more evenly compacted continuous curb without voids or cracks.

O'Hara, U.S. Pat. No. 8,128,390 issued Mar. 6, 2012 discloses a ram type portable concrete molding curb forming and extruding apparatus employing reciprocating pusher plates as a ram type extrusion device to force concrete from a hopper through the mouth of a mold.

O'Hara, U.S. Pat. No. 9,316,343 issued Apr. 19, 2016 discloses another ram type portable concrete molding curb forming and extruding apparatus employing reciprocating pusher plates as a ram type extrusion device to force concrete from a hopper through the mouth of a mold. It allows the employment of either a gas powered or electrical driven motor for different job sites.

Another variation of the ram curb forming machine is the D-shaped compression stroke apparatus disclosed in Matthias et al., U.S. Publication No. 2002/0021931 dated Feb. 21, 2002.

Auger type curb forming machines use an auger to move material through a compaction chamber into the slip form, McKinnon, U.S. Pat. No. 5,354,189, issued Oct. 11, 1994, unlike other auger systems, will travel as effectively up and down hills as it employs vibrating augers which apply pressure for compaction to forces material through a mold rearward, thereby propelling the machine forward. In addition, the vibrating augers prevent material from becoming captive to turn with the augers.

Other auger systems are: Smith, U.S. Pat. No. 3,137,220 issued Jun. 16, 1964, which discloses a curb-laying machine with a number of oppositely rotating augurs to extrude the concrete for forming curbs; Parrish et al., U.S. Pat. No. 5,018,955 issued May 28, 1991 utilizes a single auger to extrude the concrete and features a 25 slip-on curb form with various adjustment options; Bunn, U.S. Pat. No. 4,548,565 Issued Oct. 22, 1985, Coho. Jr. et al., U.S. Pat. No. 3,915,584 issued Oct. 28, 1975; and Canfield et al., U.S. Pat. No. 2,818,790 issued Jan. 7, 1958.

Cited for general interest are: Aparicio, U.S. Pat. No. 3,915,583 issued Oct. 28, 1975 disclosing a paving machine slip form; Baucum, U.S. Pat. No. 4,298,293 issued Nov. 3, 1981 disclosing a drag line operated slip form curb forming machine, Leone, U.S. Pat. No. 4,984,932 issued Jan. 15, 1991 disclosing an apparatus for continuous formation of concrete curbs via the raising and lowering of the molding to form thresholds for driveways, and intermediate tapering sections for transitions between full height curbs and thresholds; and Eggleton et al., U.S. Pat. No. 6,863,470 issued Mar. 8, 2005 employing with a curb extruding mechanism an adjustment assembly associated with the steering arm for defining different turning radius of the wheel supports, and elevation.

Although these devices all have various advantages and disadvantages, none have a dasher in the hopper to prevent bridging and are able to lay a continuous curb under a fence or against a vertical surface. The device described below provides such and invention.

BRIEF SUMMARY OF THE INVENTION

The present invention is directed to an improved manually maneuverable elliptical curb forming extruder propelled apparatus to form concrete, cementitious and other similar plastic building materials into linear curbs. It comprises a chassis frame and hopper with walls defining a compaction chamber. Mounted within the hopper is a pivoting dasher comprised of a frame sized to fit proximate the walls of the hopper with at least one cross-bar, which when pivotally affixed to the top of the hopper pivots back and forth in the hopper to break up cement bridging.

The compaction chamber has a rear opening in communication with a slip form through which is rearwardly directed the building material via the action of an elliptical compacting member with compaction arms; thereby depositing against the ground a formed curb which simultaneously propels the apparatus forward. As the rotary trowel compaction arms are approximately six inches in diameter, the compaction chamber and chassis frame are relatively small, making the apparatus light weight and very mobile to position a slip form against vertical surfaces or under fences.

Steering and castering wheels are attached to the chassis frame via swinging arms which allow the wheels to be adjusted from side to side for steering to avoid obstacles in the path of the apparatus. Jack leveling means are generally associated with the swinging arms to adjust the height and level of the chassis frame so that the curb is formed to meet the needs of the user. Preferably, quick releasing arm locks are associated with the wheels to wedge the swinging arms into the desired position to prevent play or looseness.

The front of the chassis frame defines a hopper having a bottom outlet, and structured to receive, hold, and gravity feed building material into and through the bottom outlet onto the rotating compaction arms. The lower hopper segment defines a building material compaction assembly with a compacting chamber surrounding the rotary trowel with compaction arms mounted to the chassis frame. The compacting chamber receives cementitious material from the hopper which is compacted, pushed, kneaded through the compaction chamber and slip form. This rotary compaction motion provides simultaneous compression and compaction to fill completely the mold, preventing voids and loss of waste material. Also, the continuous rotary motion continuously packs the material through the slip form.

Preferably the hopper has one straight up vertical side above the compaction chamber making it easier for the operator to see and get close to vertical surfaces next to the path of the new curb. The compaction chamber may extend under the side of the hopper to force material into a slip form also structured to extend and fit under a fence or low barrier.

When used with an open sided slip form mold, the hopper may be positioned next to a vertical surface to lay a curb against it. Alternatively, more conventional slip form molds may be employed including adjustably connected sides which can be adjusted to vary the width of the compaction chamber.

In its simplest configuration, the rotary trowel compactor is operated with two men—one to steer and control the machine, while the other shovels material into and through the hopper.

For use with a single operator, a larger capacity self-feeding segmented vibrating hopper design may be employed. In this embodiment, the hopper has upper and lower segments which are separately joined and associated with vibration means in a similar manner as that disclosed in McKinnon, U.S. Pat. No. 5,354,189 so each segment vibrates independently to aid in self feeding cementitious material into the compaction chamber. These separable segments are generally covered with a flexible rubber or plastic liner to flexibly seal the segments of the hopper and prevent the cementitious building material from sticking in the hopper.

However, vibration means are not required to be associated with the hopper or compaction chamber when the dasher pivots within the hopper. The orbital compaction motion of the compacting member adds additional vibration for continuous feed of the building material into the compaction chamber. Elliptical orbit compacting the cementitious material provides a more compact material for producing a stronger concrete requiring less finishing because of fewer voids. It also insures that the compaction chamber is always filled, minimizing power consumption and maintaining propulsion pressure. Also, a drier better hydrated concrete material may be used to better hold the form of the curb after being extruded from the machine.

To operate the device, a removable interchangeable slip form mold with open forward and rearward ends and an open bottom is positioned in communication with the compaction chamber rear opening to receive and section form the building material into a continuous curb. This slip form may be made of two parts essentially divided in half when forming curbs against a vertical surface. For example, the split form mold may be used to form a linear curb between and around the posts of a fence. When next to the post, half of the mold is removed and the post itself acts as an abutment around which half a 5 curb is formed. When the machine moves past the post, the other half of the mold is reattached to form a continuing full width linear curb segment between the posts.

As discussed above, sideward projecting slip forms are generally structured and positioned such that their rearward openings extend to the side of the compaction chamber so that the open end of the mold extends under and forms a curb beneath low lying fences or barriers.

Interchangeable slip form molds are preferably releasably attached via a spring bar retainer or a single knob so that other interchange able slip form molds can be readily inserted to provide curb designs of desired cross-sections and widths. Where a patterned or textured finish is desired, a rolling pattern member similar to that disclosed in McKinnon, U.S. Pat. No. 5,354,189 may be mounted to the chassis frame and positioned after the rear opening of the slip form to impress onto the surface of the newly formed curb a desired pattern finish.

In one preferred embodiment, the slip form mold includes means to vary the width and height of the slip form cross sectional openings to produce a variable width and height slip form. This variable slip form mold enables curbs of differing widths and heights to be produced without the necessity of maintaining an inventory of different sized slip forms. In one variable slip form embodiment, the halves of the slip form mold are extendable and slideably connected and releasably secured at a desired form width varying from 4 inches to 14 inches. Attached to the bottom perimeter of this variable slip form mold is an extendable skirt which is also slideably connected and releasably secured at a desired form height. By adjusting the width of the forms and the height of the skirt, the desired height and width curb may be produced without the necessity of changing forms. This variable form design is particularly useful to produce a fixed elevation curb along uneven ground. It is also useful to produce differing width curbs against uneven fences or vertical surfaces.

Preferably, when using different sized or varying slip forms, the orbital compacting member is adapted with an interchangeable compaction head which can be changed to correspond in size to the cross sectional area of the slip form to insure complete compaction and filling.

A drive motor, such as an electrical or internal combustion engine, is operably associated with the orbital compacting member to power the same. Usually the drive system includes a stepping gear system, similar to applicant's two stepping gear system, U.S. Pat. No. 8,303,450 issued Nov. 6, 2012 is mounted to the chassis frame to adjust the gear box output shaft drive speed. In addition to a gear box, speed adjustment means, such as a spring motor pulley associated with an electrical drive motor, or a throttle associated with an internal combustion engine, may be included to vary the input speed of the drive motor shaft.

The elliptical orbit compaction motion of the compacting member is accomplished by attaching a crank arm to the output shaft of the gear box and operably connecting said crank arm via an oscillating connecting bar which is supported and hung from the dasher assembly which is attached to the frame chassis. Operably associated with the connecting bar is a compacting member, which moves in a forward and backward elliptical orbit motion. This elliptical orbit motion moves the compacting end of the compacting member back and forth within the compacting chamber to push cementitious materials out its rear opening through the slip form for better form filling.

Other mechanisms may be included to move and orbitally compact the cementitious material described in the illustrated embodiments.

The curbing machine described above provides an improved curb forming machine with a pivoting dasher within the hopper to prevent bridging of the cement allowing the cement to feed faster and form curb more quickly. The dasher breaks up the bridge front to back as well as side to side. The compacting member sweeps up at a shallow angle through the motion compacting the bottom as well as the top of the curb. The slip forms are easily reversible, with a design which allows for interchanging many different sizes of curb slip forms. It also has adjustable swing mounted legs and is powered by a motor with a speed reduction unit associated with a crank, connecting arm, and plunger.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the Curbing Machine with Hopper Dasher and Elliptical Compaction CURBING MACHINE WITH HOPPER DASHER of the present invention, as represented in FIGS. 1 through 8, is not intended to limit the scope of the invention, as claimed, but is merely representative of presently preferred embodiments of the invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

Figure 1:
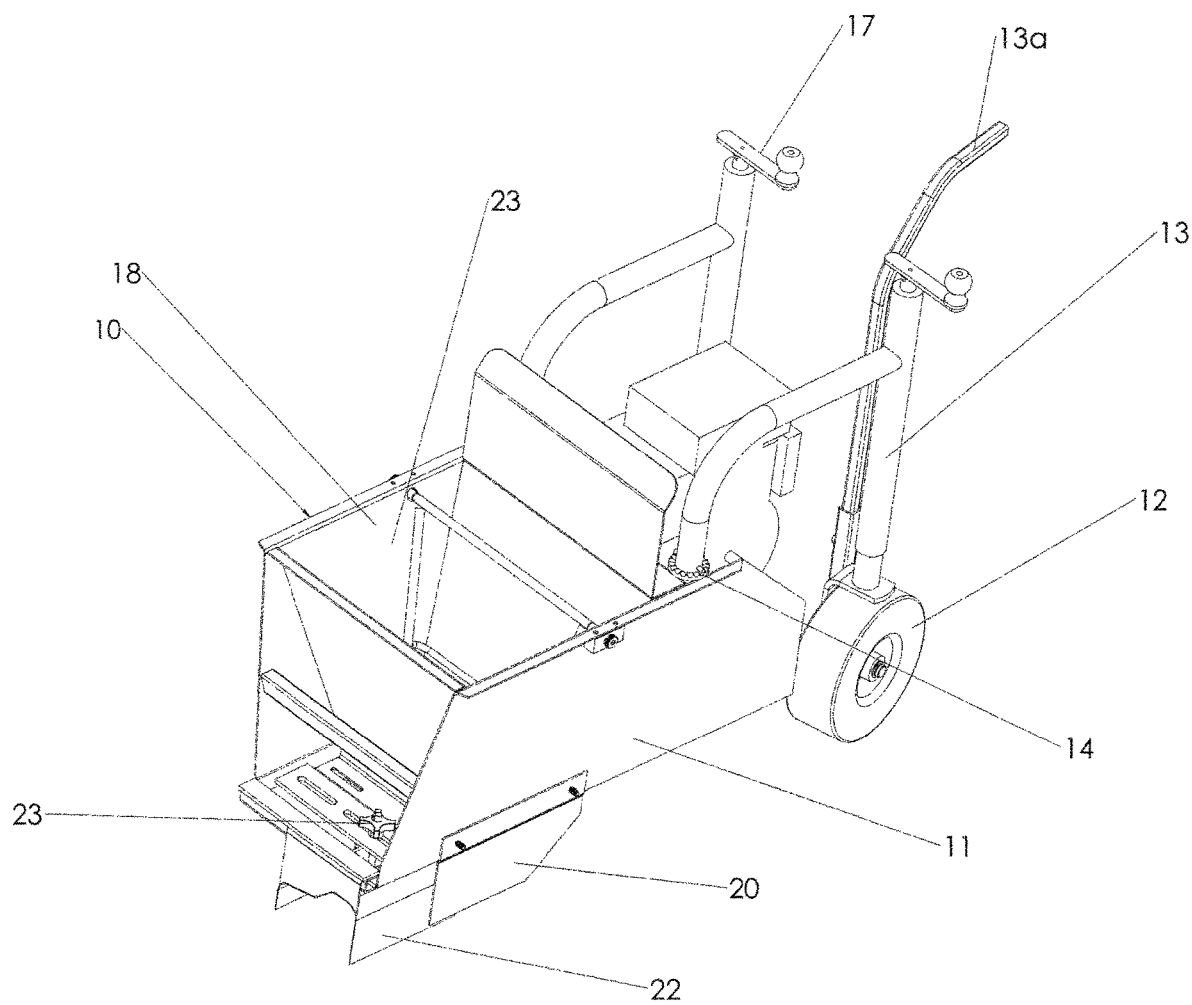
FIG. 1 is a perspective view of a preferred embodiment of the invention.

FIG. 1 is a perspective view of a preferred embodiment of the elliptical orbit compaction curb forming and extruding apparatus. A chassis frame 11 has a steering wheel 12 pivotally attached to a wheel leg 13 and secured via a position locking pin 14. A second castering wheel 15 (shown in FIG. 5) is also pivotally attached to a wheel leg 13 and secured via a second positioning locking pin 16 to enable said wheels 12, 15 to support and allow the curb forming and extruding apparatus to roll in alignment to position the curb to be laid. The wheels 12, 15 are elevated via jack cranks 17, which operate jack screws and jack screw nuts (not shown) operably associated with the steering wheel struts 13 to elevate the curb forming device 10 to the desired height. These wheels 12, 15 may include quick release means (not shown) to allow their removal for re-positioning of the curb forming machine 10.

Associated with the steering wheel 13 strut assembly may include a steering handle 13a to assist an operator in controlling and aligning the curb forming machine 10.

The chassis frame 11 defines a hopper 18 with a feed opening 19 held above the chassis frame 11. It is structured to receive, hold, and gravity feed building material into and through the hopper bottom outlet 19 shown in FIG. 4. The lower hopper defines a compaction chamber 20. The compaction chamber 19 surrounds the compacting surface 21 of the compacting member plunger 22 shown in FIG. 2 orbitally mounted to the chassis frame 11 to receive materials from the hopper bottom outlet 19 and force the building material rearward into and through the compaction chamber 20 rear opening (not shown) leading into an open ended slip frame mold 22. The building material then passes through the slip frame mold 22 to form a continuous curb deposited against the ground which simultaneously propels the apparatus 10 forward.

Preferably the hopper 18 has one straight up vertical side 23 above the compaction chamber 19 as shown in FIGS. 1, 2, 4, 5, and 6, making it easier to see, align and get close to vertical surfaces next to the path of the new curb. The particular hopper 18 shown has an extending adjoining vertical sides 24 projecting above the opposite adjoining vertical sides 23 to form a catch surface to aid in shovel filling the hopper 18.

Mounted within the hopper 18 is a dasher 29 which breaks the bridging cementitious material in the hopper 18 allowing the cementitious material to feed faster. The dasher 29 is shaped to break up the bridging material front to back as well as side to side.

Figure 2:
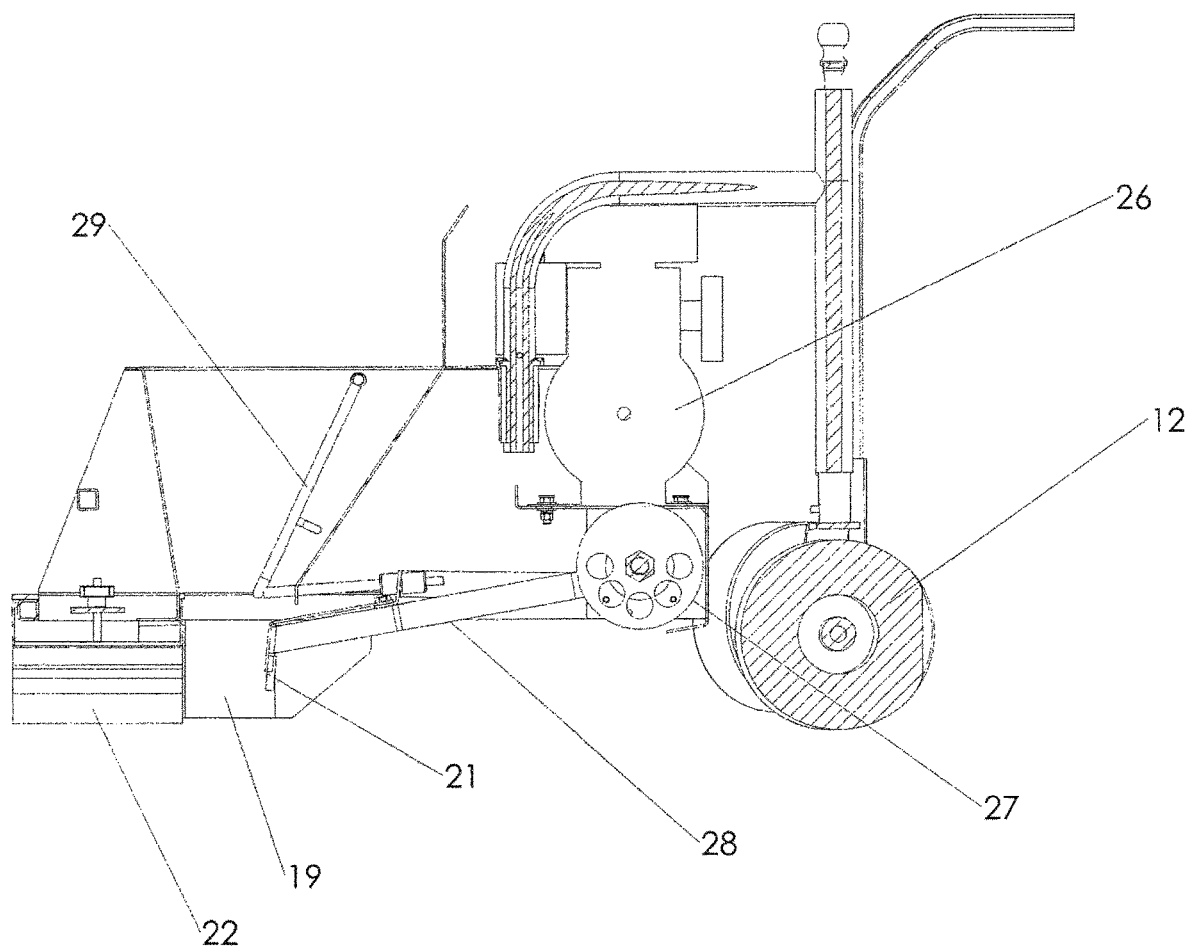
FIG. 2 is a sectional side view of the preferred embodiment of the invention shown in FIG. 1.

FIG. 2 is a sectional side view of the preferred embodiment of the invention shown in FIG. 1.

Figure 3:
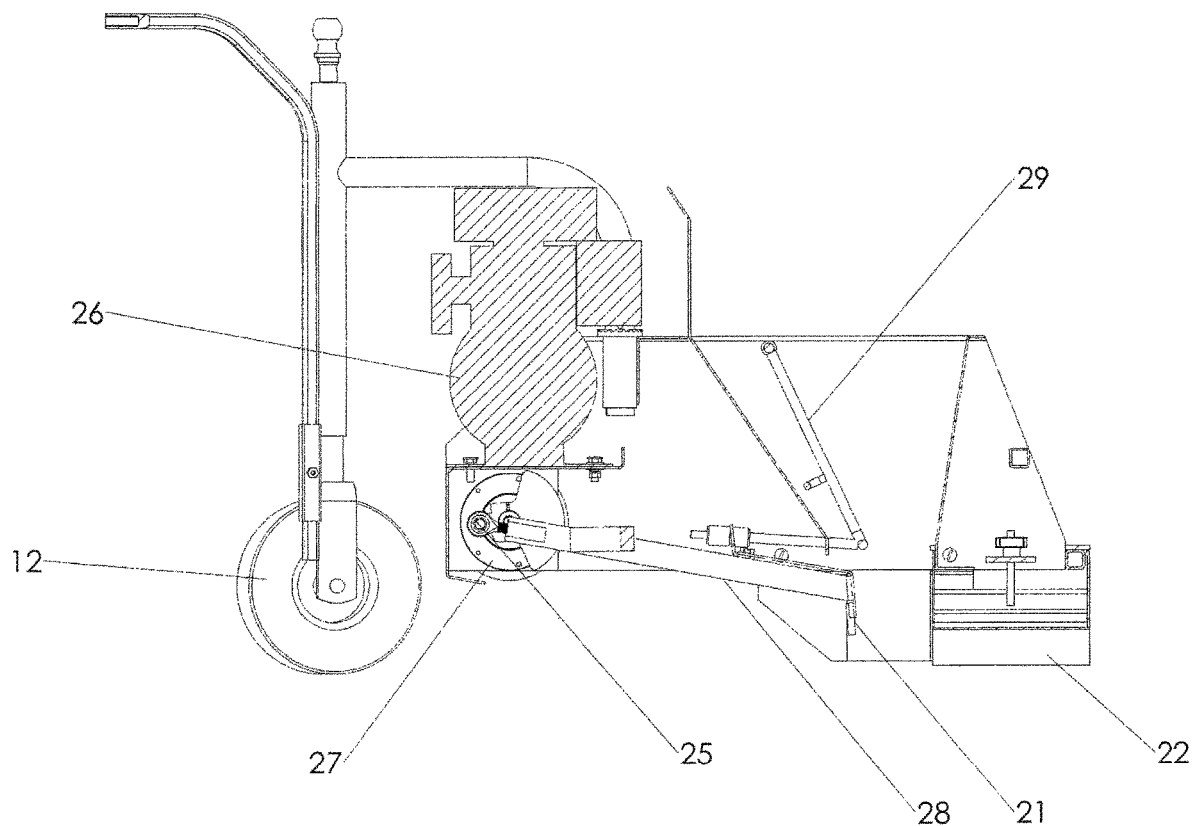
FIG. 3 is a reverse sectional side view of the preferred embodiment of the invention shown in FIG. 1

FIG. 3 is a reverse sectional side view of the preferred embodiment of the invention shown in FIG. 1

Figure 4:
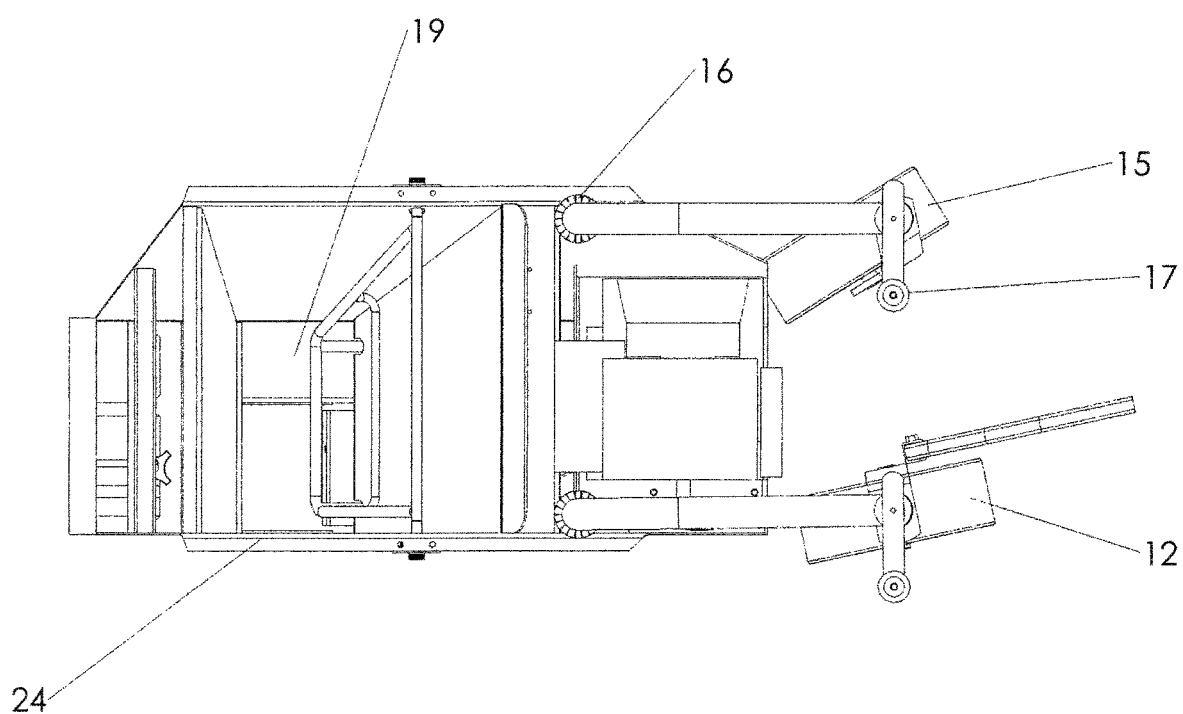
FIG. 4 is a top view of the preferred embodiment of the invention shown in FIG. 1.
Figure 5:
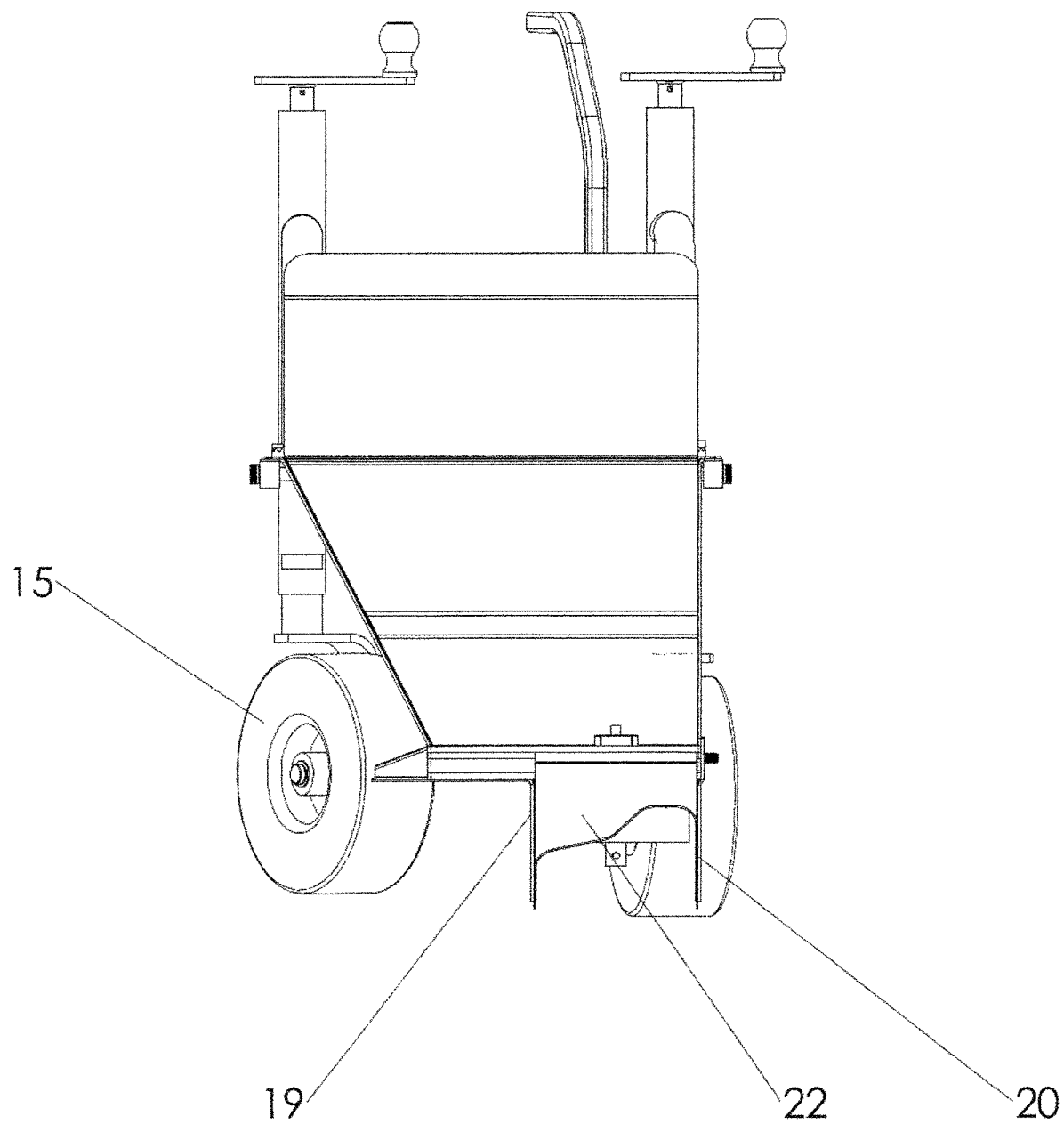
FIG. 5 is a front view of the embodiment shown in FIG. 1

FIG. 4 is a top view of the preferred embodiment of the invention shown in FIG. 1.

As shown in FIGS. 2 and 3, the elliptical orbit compacting element 21 is crank arm 25 driven via a connecting arm 28 which is attached to the crank arm 25 which is connected to the output shaft of a speed reduction gear box 27 attached to the drive shaft (not shown) of the motor 26 attached to the chassis frame 11.

The connecting arm 28 is operably connected to oscillate in an elliptical orbit motion. Removably attached to the connecting arm 28 is the compacting member 21 with a compacting surface. In the embodiment shown, the compacting surface 21 moves approximately 3 inches forward and backward, and from ½ to ⅝ inches up and down along the elliptical orbit path. The compacting member 21 thus attached moves back and forth in an elliptical orbit to push cementitious materials out the rear opening of the compaction chamber 20. The compacting member 21 has a compacting surface shown in a rectangular shape, but in other embodiments, the compacting surface 21 corresponds to the shape of the cross section of the slip form mold 22.

A removable slip form mold 22 with open forward and rearward ends, and an open bottom (not shown) is positioned in communication with the compaction chamber 20 rear opening to receive and sectionally form the building material into a continuous curb form against the ground. Interchangeable slip form molds 22 can be readily inserted to provide the desired curb design cross-section.

Figure 6:
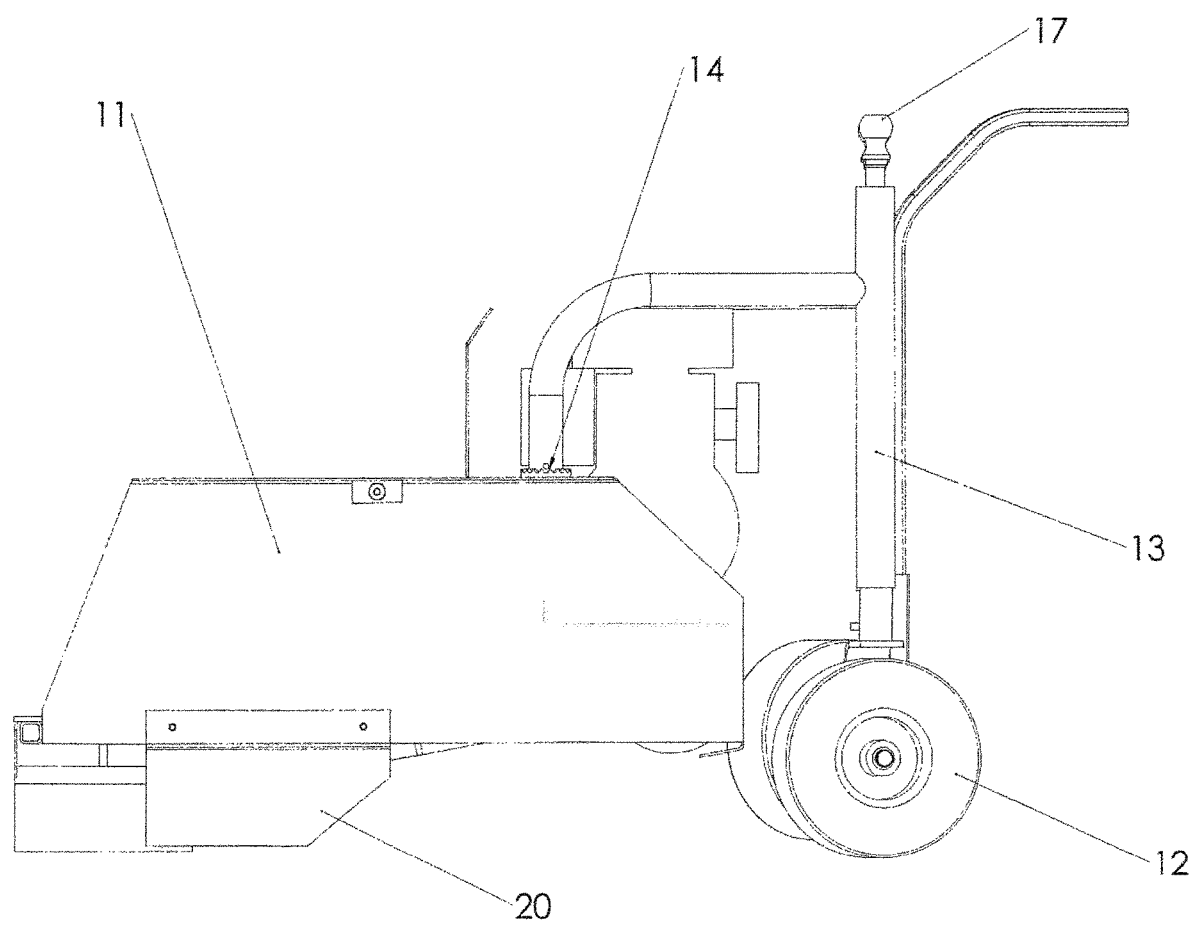
FIG. 6 is a side view of the embodiment shown in FIG. 1.

Skirts 19, 20 shown in FIG. 6 may be attached beneath the frame 11 outside of the compacting member plunger 21 to catch any leaking cementitious material encountered during compaction cycle and direct the same beneath the path of the newly formed curb for incorporation into the same.

Figure 7:
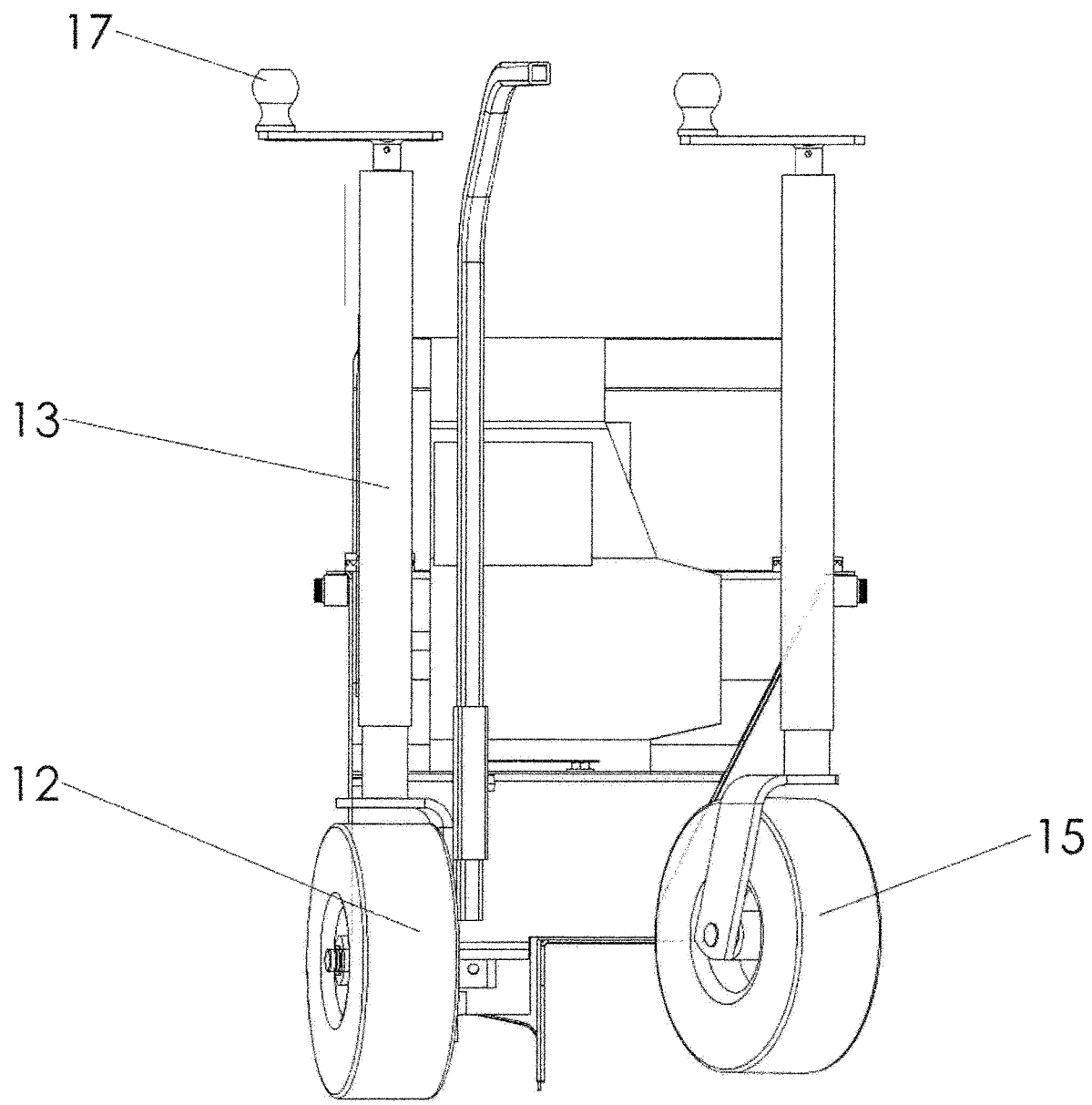
FIG. 7 is a rear view of the embodiment shown in FIG. 1.

FIG. 7 is a rear view of the embodiment shown in FIG. 1.

Figure 8:
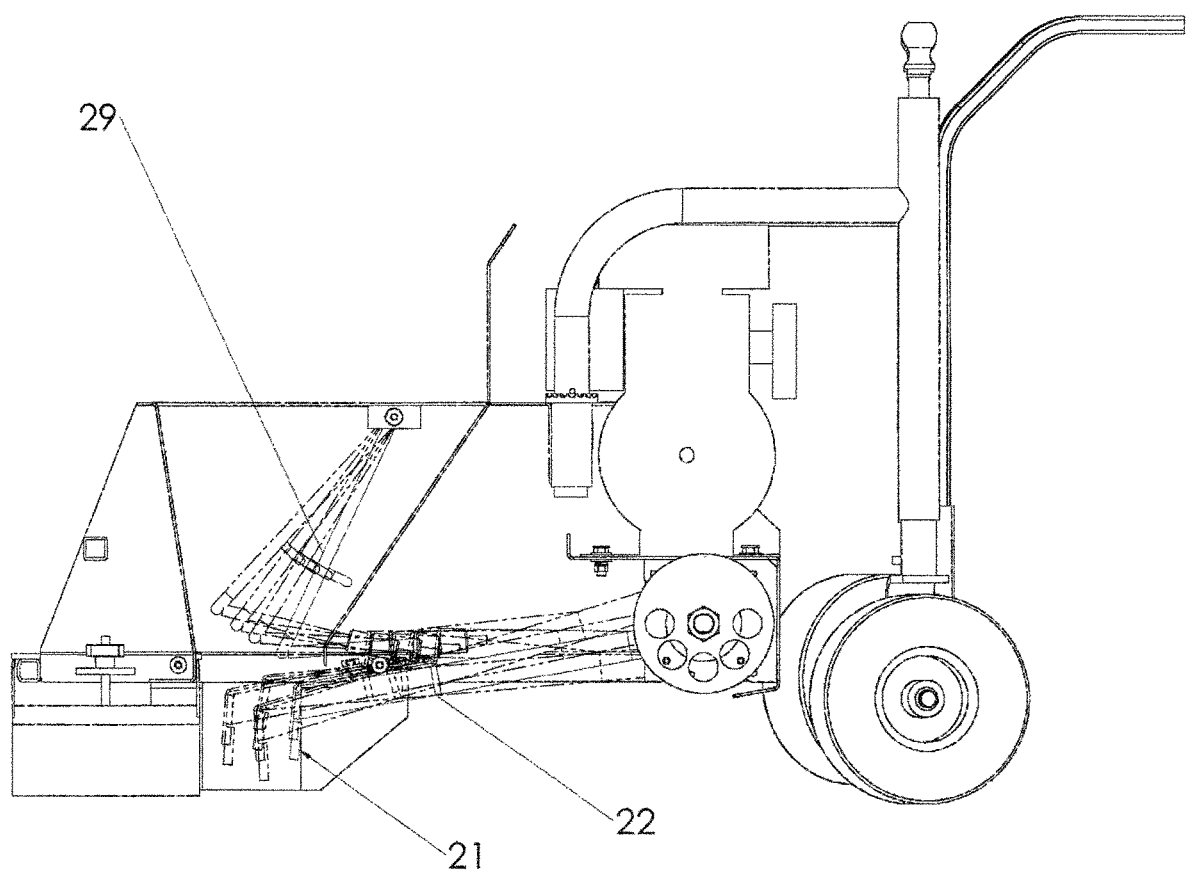
FIG. 8 is a diagram showing the motions of the dasher and plunger of the embodiment of FIG. 1.

FIG. 8 is a diagram showing the motions of the dasher 29 plunger 21 of the embodiment of FIG. 1.

Although the above description refers to the illustrated embodiments, it is not intended to restrict the scope of the appended claims. The claims themselves contain those features deemed essential to the invention.

We claim:

1. A manually maneuverable curb forming extruder propelled apparatus for concrete, cementitious and other similar plastic building materials comprising:
    a. a chassis frame with speed reduction unit with walls defining a feed hopper with a top opening and sides structured to received, hold, and gravity feed building materials into a compaction chamber having a front and rear with a rear opening which directs building materials through the rear opening to propel the chassis frame forward,
    b. a dasher with frame and cross-bar structured to mix building materials and sized to fit and pivot within the hopper pivotally affixed to the top opening to pivot front to rear as well as along the sides within the hopper to break up bridged building materials,
    c. steering and castering wheels attached to the chassis frame via swinging arms which allow the wheels to be adjusted from side to side for manual steering of the apparatus,
    d. a reciprocating compacting, member having a compacting surface orbitally mounted to the chassis frame such that the compacting surface moves in a reciprocating elliptical orbit within the compaction chamber to withdraw, drop and receive building materials from the bottom outlet of the hopper in a loading stroke, and to force and lift the building materials rearward into and through the rear opening of the compaction chamber in a compaction, stroke;
    e. a removable slip form with open forward and rearward ends and an open bottom in communication with the compaction chamber rear opening to receive and sectionally form the building material into a continuous curb form, and
    f. a drive motor with speed reducer associated with the compacting member to reciprocate and orbitally move the compacting member and, pivot the dasher.

2. A manually maneuverable curb forming extruder propelled apparatus according to claim 1, including leveling means associated with the swinging arms to adjust the height and level of the chassis frame.

3. A manually maneuverable extruder propelled curb forming apparatus according to claim 1, including a guide with an opening mounted to the chassis frame beneath the compaction chamber and structured to accommodate and travel along a reinforcing rod to align the apparatus and form a finished curb about said reinforcing rod.

4. A manually maneuverable extruder propelled curb forming apparatus according to claim 1, wherein the slip form is releasably attached via a spring bar retainer.

5. A manually maneuverable extruder propelled curb forming apparatus according to claim 1, wherein the slip form is mounted to a wall of the hopper such that the slip form can be inserted beneath and forma curb under a bottom of an overlying fence or barrier.

6. A manually maneuverable extruder propelled curb forming apparatus according to claim 1, wherein the drive motor with speed reducer includes a gear box mounted to the chassis frame with an eccentric bearing mounting connection reciprocating the compaction member.

7. A manually maneuverable extruder propelled curb forming apparatus according to claim 1, including speed adjustment means associated with the drive motor.

\* \* \* \* \*